United States Patent
Lechtenboehmer

(10) Patent No.: US 7,378,468 B2
(45) Date of Patent: May 27, 2008

(54) TIRE HAVING COMPONENT OF RUBBER COMPOSITION CONTAINING A CARBONACEOUS FILLER COMPOSITE OF DISTURBED CRYSTALLINE PHRASES AND AMORPHOUS CARBON PHASES

(75) Inventor: Annette Lechtenboehmer, Ettelbruck (LU)

(73) Assignee: The Goodyear Tire & Rubber Company, Akron, OH (US)

( * ) Notice: Subject to any disclaimer, the term of this patent is extended or adjusted under 35 U.S.C. 154(b) by 637 days.

(21) Appl. No.: 10/964,051

(22) Filed: Oct. 13, 2004

(65) Prior Publication Data

US 2005/0101718 A1    May 12, 2005

Related U.S. Application Data

(60) Provisional application No. 60/518,184, filed on Nov. 7, 2003.

(51) Int. Cl.
*C08K 3/04*    (2006.01)

(52) U.S. Cl. ............... 524/495; 524/492; 524/493; 524/496

(58) Field of Classification Search ......... 524/492, 524/493, 495, 496
See application file for complete search history.

(56) References Cited

U.S. PATENT DOCUMENTS

| | | | |
|---|---|---|---|
| 4,273,561 A | 6/1981 | Fernandez-Moran | 51/307 |
| 5,353,708 A | 10/1994 | Stavrev et al. | 102/301 |
| 5,443,861 A | 8/1995 | Huhne | 427/249 |
| 5,482,695 A | 1/1996 | Guschin et al. | 423/446 |
| 5,861,349 A | 1/1999 | Vereschagin et al. | 501/86 |
| 5,916,955 A | 6/1999 | Vereschagin et al. | 524/495 |
| 5,935,715 A | 8/1999 | Ueda | 428/426 |
| 5,985,451 A | 11/1999 | Senda et al. | 428/408 |
| 6,608,318 B1 | 8/2003 | Perkins et al. | 250/496.1 |

FOREIGN PATENT DOCUMENTS

WO    0207871    1/2002

OTHER PUBLICATIONS

European Search Report.

*Primary Examiner*—Edward J Cain
(74) *Attorney, Agent, or Firm*—Henry C. Young, Jr.

(57) ABSTRACT

This invention relates to a tire having a component of a rubber composition which contains a carbonaceous filler as a composite comprised of a disturbed crystalline structure which contains synthetic cubic (diamond) crystalline phase (s) combined with a significant amorphous phase content and which may also contain graphitic (hexagonal) crystalline phases. The crystalline phases are of a disturbed crystalline structure. The carbonaceous filler composite may therefore sometimes be referred to as a "disturbed crystalline/amorphous carbon material". Such carbonaceous filler composite may be a product of, for example, an explosive detonation of a carbon-containing, oxygen-deficient explosive. Reinforcement of rubber compositions for components of tires is provided as a combination of such carbonaceous disturbed crystalline/amorphous carbon material together with rubber reinforcing carbon black aggregates and/or synthetic amorphous silica, and optionally with starch/plasticizer composite and/or short fibers. Such tire component may be, for example, a tire tread which contains a running surface for the tire.

20 Claims, No Drawings

TIRE HAVING COMPONENT OF RUBBER COMPOSITION CONTAINING A CARBONACEOUS FILLER COMPOSITE OF DISTURBED CRYSTALLINE PHRASES AND AMORPHOUS CARBON PHASES

The Applicants hereby incorporate by reference prior U.S. Provisional Application Ser. No. 60/518,184, filed on Nov. 7, 2003.

FIELD OF THE INVENTION

This invention relates to a tire having a component of a rubber composition which contains a carbonaceous filler as a composite comprised of a disturbed crystalline structure which contains synthetic cubic (diamond) crystalline phase(s) combined with a significant amorphous phase content and which may also contain graphitic (hexagonal) crystalline phases. The crystalline phases are of a disturbed crystalline structure. The carbonaceous filler composite may therefore sometimes be referred to as a "disturbed crystalline/amorphous carbon material". Such carbonaceous filler composite may be a product of, for example, an explosive detonation of a carbon-containing, oxygen-deficient explosive. Reinforcement of rubber compositions for components of tires is provided as a combination of such carbonaceous disturbed crystalline/amorphous carbon material together with rubber reinforcing carbon black aggregates and/or synthetic amorphous silica, and optionally with starch/plasticizer composite and/or short fibers. Such tire component may be, for example, a tire tread which contains a running surface for the tire.

BACKGROUND OF THE INVENTION

Tires are conventionally composed of various components, such as for example treads, which are rubber compositions which contain various fillers such as, for example, carbon black reinforcement which is the most widely used reinforcing particulate material for various rubber products. Such rubber reinforcing carbon black is in a form of aggregates of primary carbon particles formed by, for example, of controlled deposition from a gaseous phase to form a soot. Such rubber reinforcing carbon black is well known to those having skill in the art and is reported, for example, *The Vanderbilt Rubber Handbook*, (1978) Pages 408 through 428, which includes various ASTM designations for various rubber reinforcing carbon blacks.

Rubber reinforcing carbon blacks, in a form of aggregates of very small primary carbon particles of a highly disturbed graphitic structure, differ significantly from other crystalline forms of carbonaceous materials such as, for example those of a cubic (diamond, both natural and synthetic) crystalline structure. Such crystalline carbonaceous materials are conventionally of an ordered crystalline structure. The crystalline structure is conventionally evidenced by X-ray reflection analysis or detection. Imperfections in X-ray reflections are indicative of a disturbed crystalline structure which, in the case of large disturbances, a crystalline structure cannot normally be detected, and may be conventionally referred to as being roentgen-amorphous, so that therefore the absence of appropriate X-ray reflections is indicative of the significant presence of the amorphous form of carbon. Accordingly, such crystalline carbonaceous materials having significantly less than a perfectly ordered crystalline structure are referred to herein as being composed of a combination of disturbed crystalline phases and amorphous carbon phases.

Carbonaceous materials in a form containing diamond material may be reportedly prepared by, for example, heating carbon to a very high temperature and pressure or by a detonation process. For example, see U.S. Pat. Nos. 5,353, 708, 5,861,349 and 5,916,955 as well as U.S. Pat. No. 4,273,561 showing an alternate process.

Other carbonaceous materials are reported as being formed by various detonation/combustion processes which contain synthetic diamonds as well as other carbon microstructures. For example, see U.S. Pat. Nos. 5,443,861, 5,985,451 and 5,482,695.

For example, according to U.S. Pat. No. 5,861,349, a carbonaceous diamond-containing material may be prepared by a controlled detonation process which may be comprised of about 50 to about 90 weight percent diamond cubic crystal structure phase and about 10 to about 30 weight percent amorphous carbon phase. Reportedly, from 10 to 20 percent of the surface of the material may contain methyl, nitrile and hydroxyl groups as well as functional oxycarbonic groups of the general formula: O=R where R represents =COH, =COOH, =CO, and =$C_6H_4O$ or any of their combination and from 1 to 2 percent of the surface consists of carbon atoms with non-compensated links. (Reference: A. L. Vereschagin et al. "Properties of Ultrafine Diamond Clusters from Detonation Synthesis" in *Diamond and Related Materials*, Volume 3 (1933), Pages 160 through 162.)

As hereinbefore mentioned, carbonaceous materials of a disturbed crystalline cubic, diamond-like, structure may reportedly be prepared, for example, by detonating a carbon containing, oxygen-deficient explosive in closed volume in a gaseous medium inert toward carbon to form a material of a diamond-like cubic crystalline phase and an amorphous carbon phase. The disturbed structured carbon material reportedly may have functional groups on its surface, as hereinbefore discussed, which may include, for example, one or more of methyl, carboxyl, quinone, lactone ether and aldehyde functional groups.

Thus, such disturbed cubic crystalline/graphitic structured carbon composite materials, usually referred to herein as a composite of a "disturbed crystalline/amorphous carbon material" because of its included amorphous carbon content, are of an entirely different structure than more conventional aggregates of primary carbon black particles used as rubber reinforcing carbon blacks and reportedly may contain more extensive functional groups on their surfaces to further differentiate them from such rubber reinforcing carbon blacks.

Further examples of carbon materials comprised of disturbed cubic/graphitic structure are reported by M. D. Sokolova, O. A. Andrianova and S. N. Popov at the Sixth Russian Scientific and Practical Konference of Rubber Tires, Moscow, 1998, having a particle size of about 4 to 6 nanometers and aggregates thereof of a particle size of about 20 to 30 nanometers and a BET surface area via Argon absorption of about 250 to 350 $m^2/g$.

The BET method of measuring surface area is described in the *Journal of the American Chemical Society*, Volume 60, (1930), Page 304.

Use of synthetic, explosive-formed, diamond material for use with rubbers has been discussed by A. P. Voznayokovskii, et al, in "Prospects of Using Technical-grade Diamond Carbon Synthesized by Explosion for the Reinforcement of Polyisoprene Rubbers" in *Kauchuk i Rezina*, No. 6 (1996), Page 27, with an English translation reportedly appearing in *International Polymer Science and Technology*, Volume 24, No.6, (1997), Page T/6, and as "Study of Reaction of Rubbers with Industrial Diamond Carbon Produced by Explosion Synthesis" in *International Polymer Science and Technology*, Volume 5, No.6, (1998), PageT/7, or by O. A. Adrianova, et al., in "Potential for Improving the Quality of Rubber Sealing Materials Used in the Conditions of the Far North" as reported in *International Polymer Science and Technology*, Volume 25, No. 6, (1998), Pages 24 through 27.

U.S. Pat. Nos. 6,608,318 and 5,935,715, mention the use of diamond powder in rubber for a radiation protection composition or as part of a quartz in a layer on rubber, respectively, although the nature of the diamond powder is not entirely specified.

However, this invention is directed to avoiding the sole use of a composite of a disturbed crystalline/amorphous phased carbonaceous material as a reinforcing filler additive for a rubber composition for a tire component and particularly a tire tread having a running surface intended to be ground-contacting.

Indeed, this invention is directed to a tire having a component, particularly a tread, of a rubber composition which contains a reinforcing filler as a combination of a composite of disturbed crystalline/amorphous phased carbonaceous particulate material together with rubber reinforcing carbon black aggregates (aggregates of primary graphitic carbon particles) or together with a combination of rubber reinforcing carbon black aggregates and synthetic amorphous silica aggregates (aggregates of primary silica particles), particularly in a form of synthetic amorphous precipitated silica aggregates, and wherein said filler also optionally contains a starch/plasticizer composite and/or short fibers.

As hereinbefore discussed, evidence of crystalline structure (e.g. cubic diamond and hexagonal grapitic crystalline structured phases) and amorphous carbon phases contained in the disturbed crystalline/amorphous phased carbonaceous filler for use in this invention can be discerned by X-ray diffraction. By X-ray diffraction analysis, crystalline faces of the crystalline structured regions, or phases, of the carbonaceous material can be detected and distinguished from graphitic or disturbed graphitic phases. Amorphous non-crystalline regions, or phases, of the carbonaceous material are not responsive to and are therefore not readily detectable by the X-ray diffraction method. However, the width of the X-ray scattered signal reportedly can show that the crystalline disorder or microstress (referred to in the aforesaid "Properties of Ultrafine Diamond Clusters for Detonation Synthesis" by A. L. Vereschagin, et al.) is excessive for a regular, undisturbed crystalline structure thereby indicating the significant presence of the respective phases within the disturbed, or irregular, crystalline structure of the carbonaceous material.

For the purposes of this invention, although it is envisioned herein that the disturbed crystalline/amorphous phased carbonaceous filler contains a cubic (diamond) crystalline structure, it may also typically contain a significant amount, or content, of an hexagonal (graphitic) crystalline structure as well as an amorphous carbon. Thus, it is envisioned herein that the disturbed crystalline/amorphous phased carbonaceous filler is a composite, rather than a simple blend, which may be composed of a combination of such disturbed cubic (diamond) crystalline structure and such disturbed hexagonal (graphitic) crystalline structure or composed of such disturbed cubic (diamond) crystalline structure and may also have a significant amorphous carbon content.

The term "phr" as used herein, and according to conventional practice, refers to "parts of a respective material per 100 parts by weight of rubber elastomer". In the description of this invention, the terms "rubber" and "elastomer" can be used interchangeably, unless otherwise indicated The terms "rubber composition", "compounded rubber" and "rubber compound" can be used interchangeably to refer to "rubber which has been blended or mixed with various ingredients and materials" and such terms are well known to those having skill in the rubber mixing or rubber compounding art.

SUMMARY AND PRACTICE OF THE INVENTION

In accordance with the present invention, a tire is provided having at least one component of a rubber composition comprised of, based upon parts by weight per 100 parts by weight rubber (phr):

(A) at least one diene-based elastomer, and (B) about 30 to about 120, alternately about 40 to about 80, phr of reinforcing filler comprised of:

(1) about 0.1 to about 10 phr of a particulate carbonaceous composite comprised of a combination of disturbed crystalline phases and amorphous carbon phases, and (2) about 29.9 to about 110, alternately about 39.9 to about 80, phr of at least one additional reinforcing filler selected from:

(a) about 29.9 to about 110, alternately about 39.9 to about 80, phr of rubber reinforcing carbon black, or (b) a combination of:

(1) about 19.9 to about 100, alternately about 10 to about 70, phr of rubber reinforcing carbon black, and (2) about 10 to about 90, alternately about 10 to about 50, phr of synthetic amorphous silica aggregates, preferably precipitated silica, or (c) about 29.9 to about 110, alternately about 39.9 to about 80, phr of synthetic amorphous silica aggregates, preferably precipitated silica.

In further description of this invention, said disturbed crystalline phase(s) of said particulate crystalline/amorphous carbon phased carbonaceous composite, or filler, contains a disturbed cubic (diamond) crystalline structured phase.

In additional accordance of this invention, said crystalline phase(s) of said particulate crystalline/amorphous carbon phased carbonaceous composite is comprised of a combination of disturbed cubic (diamond) crystalline structure and disturbed hexagonal (graphitic) carbon structure, or phase. The disturbed cubic crystalline carbon structured phase content may, for example, be in the minority in the composite and the disturbed hexagonal crystalline carbon structured phase content may, for example, also be in the minority insofar as the crystalline phase, or phases, of said carbonaceous composite is concerned. The total of such disturbed crystalline phases may be in a minority or a majority or about equal to the amorphous carbon phase content insofar as the combination of crystalline phases and amorphous carbon phase of the said carbonaceous composite is concerned. In practice, it is considered herein that often the amorphous carbon phase content is about equal to or greater than the disturbed crystalline phase content of the carbonaceous composite.

In practice, said reinforcing filler may also additionally and optionally include about 10 to about 50 phr of silica-containing carbon black having silica domains on its surface in place of a portion of said rubber reinforcing carbon black or said rubber reinforcing carbon black and said amorphous silica, if used.

In practice, said rubber composition of said tire component may optionally contain about 1 to about 20, alternately from about 5 to about 10, phr of a starch/plasticizer composite, wherein said starch has a softening point according to ASTM No. D1228 in a range of about 180° C. to about 220° C. and wherein said starch/plasticizer composite has a softening point in a range of about 110° C. to about 170° C. according to ASTM No. D1228, and has a plasticizer/starch weight ratio in a range of from about 0.1/1 to about 0.6/1, alternately from about 0.25/1 to about 0.4/1.

In practice, said rubber composition for said tire component may optionally contain short fibers in an amount of from about 2 to about 5 phr such as, for example, fibers selected of at least one of synthetic nylon, aramid, polyester material and from natural cellulose material.

The rubber composition of said tire component may optionally contain a coupling agent for said synthetic amorphous silica aggregates, particularly where said silica aggregates are in a form of precipitated silica, and for said starch/plasticizer composite, when said amorphous silica aggregates and/or starch/plasticizer are used, and optionally for said disturbed synthetic crystalline/amorphous carbon phased carbonaceous material, wherein said coupling agent has a moiety reactive with hydroxyl groups contained on said synthetic amorphous silica aggregates and said starch/plasticizer composite as well as components on the surface of said crystalline/amorphous carbon phased carbonaceous material and has another moiety interactive with said diene-based elastomer.

A significant aspect of the rubber composition for said tire component is the use of a cooperative combination of:

(A) said composite of disturbed crystalline/amorphous carbon phased carbonaceous material, (B) said rubber reinforcing carbon black, particularly carbon black aggregates, and/or synthetic amorphous silica, particularly precipitated silica aggregates, and;

(C) a optional coupling agent, particularly as a bis(3-triethoxysilylpropyl) polysulfide or organomercapto alkoxysilane or organomercapto alkoxysilane having a blocked mercapto moiety which is capable of being unblocked, or deblocked, by heating to a temperature in a range of about 140° C. to about 160° C. as are hereinafter discussed, and (D) an optional particulate starch/plasticizer composite, and (E) optional aforesaid short fibers.

In the practice of this invention, it is seen that the said composite of synthetic disturbed crystalline/amorphous carbon phased carbonaceous material, or filler, is used as only a minor but otherwise significant component of the rubber reinforcing filler of which primary reinforcing filler is required to be rubber reinforcing carbon black (carbon black aggregates for example as reported in the aforesaid *The Vanderbilt Rubber Handbook* and/or synthetic amorphous silica aggregates, particularly precipitated silica.

In practice, it is envisioned herein that the composite of synthetic disturbed crystalline/amorphous carbon phased carbonaceous material may be composed of, for example, from about 10 to about 55 weight percent of disturbed cubic crystalline (e.g. diamond) phase(s) or domains, and, correspondingly, from about 45 to about 90 weight percent of amorphous carbon and residual graphitic phase(s) or domains.

It is envisioned that the composite of synthetic disturbed crystalline/amorphous black phased carbonaceous material has a BET (argon gas) surface area in a range of from about 270 to about 380 m²/g. The overall BET method of surface area determination has been heretofore mentioned.

It is envisioned herein that the composite of synthetic disturbed crystalline/amorphous black phased carbonaceous material contains at least one of methyl, carboxyl, quinone, lactone, ether and aldehyde groups on its surface, a majority of which may be considered as being chemically functional in nature.

It is to be appreciated that it is considered herein that the composite of synthetic disturbed crystalline/amorphous black phased material contains both disturbed cubic crystalline domains which are disturbed in a sense of containing an interdispersion therein of amorphous carbon domains or phases and which may also contain disturbed hexagonal (graphitic) carbon domains or phases. It is understood to present a relatively active (or high energy related) surface, because, at least in part, of its lattice irregularities, or deviations, from a well ordered crystalline structure, or lattice.

In practice, as hereinbefore discussed, said optional coupling agent typically has a moiety reactive with hydroxyl groups and another moitey interactive with a diene hydrocarbon-based elastomer.

For example, such optional coupling agent may be a bis(3-trialkylsilylalkyl) polysulfide, (for example, a bis(3-triethoxysilylpropyl) polysulfide), having an average in a range of from 2 to about 4, or an intermediate average of from 2 to about 2.6 or from about 3.5 to about 4, usually preferably an average in a range of from about 2 to about 2.6, connecting sulfur atoms in its polysulfidic bridge.

Alternately, said optional coupling agent may have an alkoxysilane moiety for reaction with hydroxyl groups on the on the amorphous silica (e.g. silanol groups) if silica is used, and/or said starch/plasticizer composite if used, and a mercapto functionality, or moiety, for interaction with the diene-based elastomer(s).

Representative of such coupling agent is, for example, an organomercapto alkoxysilane such as for example, mercaptopropyl triethoxysilane. Alternately, such coupling agents with a mercapto functionality, or moiety, may be used in which the mercapto functionality, or moiety, is blocked by a moiety which is itself labile and in which the blocked mercapto functionality is then deblocked under the rubber vulcanization conditions of elevated temperature to provide the diene-based rubber interactive mercapto functionality. Thus an appropriate organomercapto alkoxysilane such as, for example, mercaptopropyl triethoxysilane, with its mercapto group blocked by such a moiety (e.g. organomercapto trialkylsilane, or mercaptopropyl triethoxysilane having a blocked mercapto moiety with a moiety which capable of being deblocked at an elevated temperature) may be used for which its mercapto moiety is then deblocked during vulcanization of the associated rubber composition at an elevated temperature such as, for example, a temperature in a range of from about 140° C. to about 160° C. For example, see U.S. Pat. Nos. 6,127,468, 6,204,339, 6,414,061, 6,528,673 and 6,608,125 which are incorporated herein in their entirety.

Optionally, said coupling may be provided (mixed with said rubber composition) as a pre-reacted composite thereof with said amorphous silica, particularly precipitated silica, or with said composite of carbonaceous disturbed crystalline/amorphous material instead of reacting therewith in situ within the diene based elastomer host, particularly where said coupling agent has a capability of producing an alcohol byproduct upon reaction with an hydroxyl group contained on said silica and/or carbonaceous composite and where it might be desired to not generate, or otherwise produce, alcohol as a byproduct in situ within the elastomer host. For such purpose, the coupling agent pre-reacted composite may additionally include pre-reaction of an alkoxysilane therewith.

As hereinbefore discussed, an optional particulate starch/plasticizer composite may be used. For said starch/plasticizer composite, the plasticizer is preferably comprised primarily of a synthetic poly(ethylenevinyl alcohol), although it may contain additional or be other synthetic plasticizers. The poly(ethylenevinyl alcohol) may have a molecular weight (number average), for example, in a range of from about 11,000 to about 60,000. It may conventionally have, for example, a vinylalcohol/ethylene mole ratio of about 60/40 although it is expected that such ratio may vary somewhat.

In general, the blending of the starch and plasticizer involves what is considered or believed herein to be relatively strong chemical and/or physical interactions between the starch and the plasticizer.

In general, the plasticizer/starch composite may have a plasticizer to starch weight ratio in a range of about 0.1/1 to about 0.6/1, so long as the plasticizer/starch composition has the required softening point range, and preferably, is capable of being a free flowing, dry powder or extruded pellets, before it is mixed with the elastomer(s).

While the synthetic plasticizer(s) may have a viscous nature at room temperature, or at about 23° C. and, thus, considered to be a liquid for the purposes of this description, although the plasticizer may actually be a viscous liquid at room temperature since it is to be appreciated that many plasticizers are polymeric in nature.

Representative examples of synthetic plasticizers are, for example, the aforesaid poly(ethylenevinyl alcohol) as well as cellulose acetate and diesters of dibasic organic acids, so long as they have a softening point sufficiently below the softening point of the starch with which they are being combined so that the starch/plasticizer composite has the required softening point range.

Preferably, the synthetic plasticizer is comprised of at least one of poly(ethylenevinyl alcohol) and cellulose acetate and, as hereinbefore mentioned, more preferably the plasticizer is comprised primarily of poly(ethylenevinyl alcohol).

For example, the aforesaid poly(ethylenevinyl alcohol) might be prepared by polymerizing vinyl acetate to form a poly(vinylacetate) which is then hydrolyzed (acid or base catalyzed) to form the poly(ethylenevinyl alcohol). Such reaction of vinyl acetate and hydrolyzing of the resulting product is well known to those skilled in such art.

For example, vinylalcohol/ethylene (for example in a 60/40 mole ratio) copolymers can be obtained in powder forms at different molecular weights and crystallinities such as, for example, a molecular weight of about 11700 with an average particle size of about 11.5 microns or a molecular weight (weight average) of about 60,000 with an average particle diameter of less than 50 microns.

Various blends of starch and ethylenevinyl alcohol copolymers, namely the poly(ethylenevinyl alcohol), can then be prepared according to mixing procedures well known to those having skill in such art.

Representative examples of use of starch/plasticizer composites and their use in rubber compositions as various components of articles such as tires may be found, for example, in U.S. Pat. Nos. 5,672,639, 6,273,163, 6,458,871, 5,672,639, 6,269,858 and 6,391,945.

In practice, various diene-based elastomers may be used such as, for example, homopolymers and copolymers of monomers selected from isoprene and 1,3-butadiene and copolymers of at least one diene selected from isoprene and 1,3-butadiene and a vinyl aromatic compound selected from styrene and alphamethyl styrene, preferably styrene.

Representative of such diene-based elastomers (conjugated diene-based elastomers) are, for example, cis 1,4-polyisoprene (natural and synthetic), cis 1,4-polybutadiene, styrene/butadiene copolymers (aqueous emulsion polymerization prepared and organic solvent solution polymerization prepared), medium vinyl polybutadiene having a vinyl 1,2-content in a range of about 15 to about 90 percent, isoprene/butadiene copolymers, styrene/isoprene/butadiene terpolymers. Tin coupled elastomers may also be used, such as, for example, tin coupled organic solution polymerization prepared styrene/butadiene co-polymers, isoprene/butadiene copolymers, styrene/isoprene copolymers, polybutadiene and styrene/isoprene/butadiene terpolymers.

While commonly employed synthetic amorphous silica, or siliceous pigments, used in rubber compounding applications can be used as the silica in this invention, including precipitated siliceous pigments and fumed (pyrogenic) silica, as earlier presented herein said silica is preferably in a form of aggregates of primary particles of synthetic, amorphous precipitated silica.

The precipitated silica aggregates preferably employed in this invention are precipitated silicas such as, for example, those obtained by the acidification of a soluble silicate, e.g., sodium silicate and may include co-precipitated silica and a minor amount of aluminum. Such precipitated silica aggregates are well known to those having skill in such art.

Such silicas might usually be characterized, for example, by having a BET surface area, as measured using nitrogen gas, preferably in the range of about 40 to about 600, and more usually in a range of about 50 to about 300 square meters per gram. As hereinbefore mentioned, the BET method of measuring surface area is described in the *Journal of the American Chemical Society*, Volume 60, Page 304 (1930).

The silica may also be typically characterized by having a dibutylphthalate (DBP) absorption value in a range of about 50 to about 400 $cm^3/100$ g, and more usually about 100 to about 300 $cm^3/100$ g.

Various commercially available precipitated silicas may be considered for use in this invention such as, only for example herein, and without limitation, silicas from PPG Industries under the Hi-Sil trademark with designations Hi-Sil 210, Hi-Sil 243, etc; silicas from Rhodia as, for example, Zeosil 1165 MP and Zeosil 165GR, silicas from J. M. Huber Corporation as, for example, Zeopol 8745 and Zeopol 8715, silicas from Degussa AG with, for example, designations VN2 and VN3, as well as other grades of silica, particularly precipitated silicas, which can be used for elastomer reinforcement.

In practice, the rubber and various ingredients, including the reinforcing fillers may be blended, for example, in at least one preparatory mixing step (usually referred to as a non-productive mixing step) in the absence of sulfur curative in at least one internal rubber mixer to a temperature in a range of, for example, about 150° C. to about 180° C., followed by blending the mixture thereof in a subsequent mixing step (usually referred to as a productive mixing step) with sulfur curative(s) in a subsequent (productive) blending step in an internal rubber mixer to a temperature in a range of, for example, about 110° C. to about 120° C. Such rubber mixing procedure involving such sequential non-productive and productive mixing steps is well known to those having skill in such art.

In practice, the optional coupling agent, or composite of pre-reacted coupling agent, may be added in one or more non-productive (preparatory) mixing steps. Optionally, the addition of one or more of such coupling agents may be divided into an addition in a non-productive (preparatory) mixing step and in a productive mixing step together with the sulfur curative.

As hereinbefore discussed, if the reaction of the coupling agent with the hydroxyl groups on the surface of the silica is expected to yield an alcohol such as, for example, ethanol during the manufacture of various silica reinforced rubber products and if such evolution of alcohol in the manufacture of rubber products might not be desired, coupling agents which release water instead of alcohol might be used or which have been pre-treated with the coupling agent before mixing with the rubber.

The forming of a tire component is contemplated to be by conventional means such as, for example, by extrusion of rubber composition to provide a shaped, unvulcanized rubber component such as, for example, a tire tread. Such forming of a tire tread is well known to those having skill in such art.

It is understood that the tire, as a manufactured article, is prepared by shaping and sulfur curing the assembly of its components at an elevated temperature (e.g. 140° C. to 180° C.) and elevated pressure in a suitable mold. Such practice is well known to those having skill in such art.

It is readily understood by those having skill in the art that the rubber composition would be compounded by methods generally known in the rubber compounding art, such as mixing the various sulfur-vulcanizable constituent rubbers with various commonly used additive materials, as herein before discussed, such as, for example, curing aids such as sulfur, activators, retarders and accelerators, processing additives, such as rubber processing oils, resins including tackifying resins, fillers including the aforesaid silica and fillers, plasticizers, pigments, fatty acid, zinc oxide, waxes, antioxidants and antiozonants, peptizing agents and reinforcing materials such as, for example, carbon black. As known to those skilled in the art, depending on the intended use of the sulfur vulcanizable and sulfur vulcanized material (rubbers), the additives mentioned above are selected and commonly used in conventional amounts.

Representative of phenolic antidegradants for use in this invention are, for example, antioxidants such as polymeric hindered phenol, Wingstay® HLS available from The Goodyear Tire & Rubber Company, including phenolic antidegradants disclosed in *The Vanderbilt Rubber Handbook* (1978), Pages 344 through 346. Other non-staining antidegradants such as poly(oxyalkylene) amine known as OZONOX RP-2 available from Sovereign Chemical Company and cyclic acetal known as Vulkazone AFS available from Bayer A. G., can be considered part of this invention.

Representative non-aromatic rubber processing oils for use in this invention, namely such oils which contain less than 15 weight percent aromatic compounds, if at all, are, and for example, contain 46 percent to 51 percent paraffinic content and 36 percent to 42 percent naphthenic content.

Typical amounts of fatty acids, if used which can include stearic acid, comprise about 0.5 to about 3 phr. Typical amounts of zinc oxide comprise about 1 to about 5 phr. Typical amounts of waxes comprise about 1 to about 5 phr. Often microcrystalline waxes are used. Typical amounts of peptizers comprise about 0.1 to about 1 phr. Typical peptizers may be, for example, pentachlorothiophenol and dibenzamidodiphenyl disulfide.

The vulcanization is conducted in the presence of a sulfur vulcanizing agent. Examples of suitable sulfur vulcanizing agents include elemental sulfur (free sulfur) or sulfur donating vulcanizing agents, for example, an amine disulfide, polymeric polysulfide or sulfur olefin adducts. Preferably, the sulfur vulcanizing agent is elemental sulfur. As known to those skilled in the art, sulfur vulcanizing agents are used in an amount ranging from about 0.5 to about 4 phr, or even, in some circumstances, up to about 8 phr, with a range of from about 1.5 to about 2.5 sometimes being preferred.

Accelerators are used to control the time and/or temperature required for vulcanization and to improve the properties of the vulcanizate. In one embodiment, a single accelerator system may be used, i.e., primary accelerator. Conventionally and preferably, a primary accelerator(s) is used in total amounts ranging from about 0.5 to about 4, preferably about 0.8 to about 2.5, phr. In another embodiment, combinations of a primary and a secondary accelerator might be used with the secondary accelerator being used in smaller amounts (of about 0.05 to about 3 phr) in order to activate and to improve the properties of the vulcanizate. Combinations of these accelerators might be expected to produce a synergistic effect on the final properties and are somewhat better than those produced by use of either accelerator alone. In addition, delayed action accelerators may be used which are not affected by normal processing temperatures but produce a satisfactory cure at ordinary vulcanization temperatures. Vulcanization retarders might also be used. Suitable types of accelerators that may be used in the present invention are amines, disulfides, guanidines, thioureas, thiazoles, thiurams, sulfenamides, dithiocarbamates and xanthates. Preferably, the primary accelerator is a sulfenamide. If a second accelerator is used, the secondary accelerator is preferably a guanidine, dithiocarbamate or thiuram compound.

The mixing of the rubber composition can preferably be accomplished by the aforesaid sequential mixing process. For example, the ingredients may be mixed in at least three stages, namely, at least two non-productive (preparatory) stages followed by a productive (final) mix stage. The final curatives are typically mixed in the final stage which is conventionally called the "productive" or "final" mix stage in which the mixing typically occurs at a temperature, or ultimate temperature, lower than the mix temperature(s) of the preceding non-productive mix stage(s). The terms "non-productive" and "productive" mix stages are well known to those having skill in such art.

The following example is presented to further illustrate the invention. The parts and percentages are by weight unless otherwise indicated.

EXAMPLE I

Rubber compositions are prepared and referred to as Control Sample A and Samples B through D. Samples B through D contain a synthetic disturbed crystalline/amorphous carbon phased carbonaceous composite in a particulate form of a powder. Reportedly, the composite was composed of primary particles having an average diameter of about 4.5 nanometers (nm).

The rubber compositions were prepared in an internal rubber mixer using several mixing stages, namely, one non-productive mix stage, in which ingredients are mixed except for sulfur curative and vulcanization accelerator for about six minutes to a temperature of about 160° C., dumped from the mixer, sheeted out and allowed to cool to below 40° C.

The resulting rubber composition is then mixed in a productive mixing stage in an internal rubber mixer in which sulfur curative and accelerator are added for about two minutes to a temperature of about 120° C.

Mixing rubber composition in sequential non-productive and productive mixing stages is well known to those having skill in such art as hereinbefore discussed.

The formulations for Control Sample A and Samples B through D are shown in the following Table 1.

TABLE 1

| Material | Control Sample A | Sample B | Sample C | Sample D |
|---|---|---|---|---|
| Non-Productive Mix Stage (to 160° C.) | | | | |
| Emulsion SBR rubber[1] | 100 | 100 | 100 | 100 |
| Carbonaceous composite[2] | 0 | 0.5 | 1 | 2 |
| Carbon black (N234)[3] | 50 | 50 | 50 | 50 |
| Zinc oxide | 3.5 | 3.5 | 3.5 | 3.5 |
| Fatty acid[4] | 2 | 2 | 2 | 2 |
| Antioxidant[5] | 2 | 2 | 2 | 2 |
| Productive Mix Stage (to 120° C.) | | | | |
| Sulfur | 1.4 | 1.4 | 1.4 | 1.4 |
| Accelerator(s)[6] | 1.5 | 1.5 | 1.5 | 1.5 |

[1] Aqueous emulsion polymerization prepared styrene/butadiene rubber containing about 23.5 percent bound styrene obtained as SBR1721 ™ from the Enichem Company
[2] Synthetic carbonaceous composite as particles of Ultradiamond ™ 50 from the Ultradiamond Technologies Inc. composed of disturbed cubic crystalline phases and a combination with amorphous and disturbed graphitic phases, reportedly in a weight ratio of about 50/30/20, understood to have been prepared by controlled explosive detonation of a carbon material with a deficiency of oxygen in a inert atmosphere.
[3] N-234 rubber reinforcing carbon black, an ASTM designation.
[4] Primarily stearic acid
[5] Of the mixed aryl-p-phenylenediamines type
[6] N-tert butyl-2-benzothiazyl sulfenamide Various physical properties for rubber Samples of Table 1 are reported in the following Table 2.

TABLE 2

| | Samples | | | |
|---|---|---|---|---|
| | Control Sample A | Sample B | Sample C | Sample D |
| Carbonaceous composite | 0 | 0.5 | 1 | 2 |
| MDR Rheometer | | | | |
| T90 (minutes)[1] | 13.7 | 12.2 | 11.1 | 10.2 |
| Stress-Strain, Cure 32 minutes at 150° C. | | | | |
| 100% modulus (ring) (MPa) | 2.6 | 2.7 | 2.7 | 3 |
| 200% modulus (ring) (MPa) | 7.1 | 7.4 | 7.5 | 8.4 |
| 300% modulus (ring) (MPa) | 13.9 | 14.9 | 14.5 | 15.9 |
| Ultimate tensile strength (MPa) | 22.8 | 24.9 | 232.9 | 23.8 |
| Ultimate elongation (%) | 466 | 491 | 474 | 458 |
| Specific tear energy[2] (23° C.) (MPa) | 39.8 | 47.1 | 43.6 | 43.7 |
| True tensile strength[3] (23° C.) (MPa) | 129 | 145 | 136 | 133 |
| Shore A hardness (23° C.) | 70.7 | 71.8 | 71.7 | 73 |
| Rebound, Zwick (23° C.) | 41.2 | 40.2 | 39.4 | 40.4 |
| DIN Abrasion (10 N), DIN53 516, relative | 0 | 90.4 | 0 | 97.3 |

The MDR instrument (Moving Die Rheometer) was model MDR-2000 by Alpha Technologies. Such instrument may be used, for example, for determining cure characteristics of elastomeric materials, such as for example, the T90 property.

[1] The T90 is the time determined by the MDR analytical instrument to be the time to 90 percent of cure of the rubber sample.
[2] The Specific tear energy is the area under the stress-strain curve determined by a Zwick tensile tester, a force/displacement instrument using conditions of DIN 53504 (Ring tensile test) until the rubber sample breaks. The specific tear energy is considered herein as being a measure, or indication, of the energy necessary to break the sample and thus its resistance to break.
[3] The true tensile strength is calculated from the ultimate tensile strength and ultimate elongation by utilization of the DIN 53504 test (Ring tensile test) in which the measured tensile value at break is corrected by a factor which depends upon the elongation observed at break which is understood to be well known by those having skill in such art. The true tensile strength is considered herein as being a measure, or indication, of tear behavior, when elongations are imposed from the outside, namely from service conditions of a tire during rolling under extreme cornering or on uneven surfaces.

From Table 2 it can be seen that Samples B and C, as compared to Control Sample A, shows that an increased (improved) tear resistant property (ultimate tensile property) is observed without substantially decreasing elongation when using the carbonaceous composite.

This is considered herein to be significant because, when using a more conventional rubber reinforcing carbon black to reinforce a rubber composition containing a diene-based rubber, if the rubber composition's tear resistance property increased (resistance to tear), it would normally be expected that its ultimate elongation value would also decrease which is often not a desirable feature where an increase in resistance to tear is a desirable property.

From Table 2 it further be seen that for Samples B, C and D, as compared to Control Sample A, Specific tear energy is increased together with the True tensile strength value.

This is considered herein to be significant because these properties are indicative for a good (minimalized) tear behavior, desirable for a tire tread or all rubber parts of a tire, to thereby increase its durability and resistance to damage from external forces.

The following Table 3 is provided to show the storage modulus G' of the rubber Samples at various dynamic shear strains.

TABLE 3

G' Storage Modulus (MPa) at Respective Strains (Percent Strains)
Samples

| | Control Sample A | Sample B | Sample C | Sample D |
|---|---|---|---|---|
| Carbonaceous Composite | 0 | 0.5 | 1 | 2 |
| Percent Strain | Storage Modulus (G')[1], MPa | | | |
| 0.01 | 9.7 | 11.1 | 10.7 | 11.4 |
| 0.05 | 9.7 | 11.1 | 10.7 | 11.2 |
| 0.1 | 9.6 | 11 | 10.6 | 11.2 |
| 0.5 | 8.1 | 9.2 | 8.9 | 9.2 |
| 1 | 6.7 | 7.4 | 7.2 | 7.4 |
| 2 | 5.3 | 5.9 | 5.7 | 6 |
| 3 | 4.6 | 5.1 | 4.9 | 5.2 |
| 5 | 3.9 | 4.3 | 4.1 | 4.4 |
| 7 | 3.6 | 3.9 | 3.7 | 3.9 |

TABLE 3-continued

G' Storage Modulus (MPa) at Respective Strains (Percent Strains)
Samples

| | | | | |
|---|---|---|---|---|
| 10 | 3.3 | 3.5 | 3.6 | 3.5 |
| 15 | 2.9 | 3.1 | 3 | 3.1 |
| 20 | 2.7 | 2.8 | 2.7 | 2.8 |

[1]The storage modulus G' was measured at 7.8 Hertz at about 23° C. in shear by an Viscoanalyser VA3000 from Metravib R.D.S., an analytical instrument testing under conditions similar to ASTM D2231.

The following Table 4 is provided to show the tan delta[1] of the rubber Samples at various dynamic strains.

TABLE 4

Tan Delta at Respective Strains (Percent Strains)
Samples

| | Control Sample A | Sample B | Sample C | Sample D |
|---|---|---|---|---|
| Carbonaceous Composite | 0 | 0.5 | 1 | 2 |
| Percent Strain | Tan Delta[1] | | | |
| 0.01 | 0.124 | 0.125 | 0.124 | 0.120 |
| 0.05 | 0.125 | 0.123 | 0.123 | 0.120 |
| 0.1 | 0.127 | 0.125 | 0.125 | 0.122 |
| 0.5 | 0.178 | 0.181 | 0.180 | 0.180 |
| 1 | 0.230 | 0.242 | 0.238 | 0.240 |
| 2 | 0.279 | 0.286 | 0.283 | 0.280 |
| 3 | 0.290 | 0.298 | 0.295 | 0.293 |
| 5 | 0.289 | 0.296 | 0.294 | 0.292 |
| 7 | 0.280 | 0.286 | 0.285 | 0.282 |
| 10 | 0.269 | 0.274 | 0.273 | 0.270 |
| 15 | 0.256 | 0.260 | 0.261 | 0.257 |
| 20 | 0.248 | 0.253 | 0.253 | 0.250 |

[1]The Tan Delta was measured at 7.8 Hertz at about 23° C. in shear by aforesaid Viscoanalyser From Tables 3 and 4, it can be seen that the rubber compositions of Samples B, C and D, as compared to Control Sample A, an increased (improved) storage modulus G' for all strain values between 0.01 to 5 percent strain is obtained when including the carbonaceous composite in the rubber composition, without substantially increasing its tan delta value in the same range of strains. Tan delta is considered herein to be a measure of the hysteresis of a rubber composition while G' is indicative of the stiffness of a rubber composition. An improved stiffness without increase hysteresis would lead, for example in a tire tread, to a better handling performance without resulting in the same tread higher heat build up.

The phenomenon persists over the whole range of strains for the storage modulus G' (Table 3 and for tan delta (Table 4).

This is considered herein to be significant because, when using a more conventional rubber reinforcing carbon black to reinforce a rubber composition containing a diene-based rubber, if the rubber composition's storage modulus G' is increased, it would normally be expected that its Tan Delta value would also increase (e.g. an increase in hysteresis) which is often not a desirable feature where a reduction in tire rolling resistance and increase in heat durability are desirable properties for a tire with a tread of such rubber composition.

While certain representative embodiments and details have been shown for the purpose of illustrating the invention, it will be apparent to those skilled in this art that various changes and modifications may be made therein without departing from the spirit or scope of the invention.

What is claimed is:

1. A tire having at least one component of a rubber composition comprised of, based upon parts by weight per 100 parts by weight rubber (phr):
   (A) at least one diene-based elastomer, and
   (B) about 30 to about 120 phr of reinforcing filler comprised of:
      (1) about 0.1 to about 10 phr of a particulate carbonaceous composite comprised of a combination of disturbed crystalline phases and amorphous carbon phases, and
      (2) about 29.9 to about 110 phr of at least one additional reinforcing filler selected from:
         (a) about 29.9 to about 110 phr of rubber reinforcing carbon black, or
         (b) a combination of:
            (1) about 19.9 to about 100 phr of rubber reinforcing carbon black, and
            (2) about 10 to about 90 phr of synthetic amorphous precipitated silica aggregates, or
         (c) about 29.9 to about 110 phr of synthetic amorphous precipitated silica aggregates.

2. The tire of claim 1 wherein said carbonaceous composite is composed of disturbed cubic crystalline phases containing an interdispersion of graphitic crystalline phases and amorphous carbon phases.

3. The tire of claim 2 wherein said amorphous carbon phase content is about equal to or greater than the disturbed crystalline phase content.

4. The tire of claim 2 wherein said reinforcing filler is composed of said carbonaceous composite and rubber reinforcing carbon black.

5. The tire of claim 2 wherein said reinforcing filler is composed of said carbonaceous composite, rubber reinforcing carbon black and said precipitated silica.

6. The tire of claim 1 wherein said reinforcing filler is composed of said carbonaceous composite and said precipitated silica.

7. The tire of claim 1 wherein said reinforcing filler includes a carbon black which contains domains of silica on its surface.

8. The tire of claim 1 wherein said rubber composition contains from about 1 to about 20 phr of particulate starch/plasticizer composite.

9. The tire of claim 8 wherein said plasticizer is comprised of poly(ethylenevinyl alcohol).

10. The tire of claim 1 wherein said rubber composition contains from about 2 to about 5 phr of short fibers.

11. The tire of claim 10 wherein said short fibers are selected from at least one of nylon, aramid, polyester and natural cellulose materials.

12. The tire of claim 1 wherein said rubber composition contains a coupling agent having a moiety reactive with hydroxyl groups contained on said carbonaceous composite, synthetic amorphous silica aggregates and another moiety interactive with said diene-based elastomer(s).

13. The tire of claim 12 wherein said coupling agent is a bis(3-triethoxysilylpropyl) polysulfide having an average of from 2 to 4 connecting sulfur atoms in its polysulfidic bridge.

14. The tire of claim 12 wherein said coupling agent is a bis(3-triethoxysilylpropyl) polysulfide having an average of from 2 to 2.6 connecting sulfur atoms in its polysulfidic bridge.

15. The tire of claim 12 wherein said coupling agent is an organomercaptoalkoxysilane.

16. The tire of claim 12 wherein said coupling agent is pre-reacted, prior to mixing with said diene-based elastomer(s), with at least one of said amorphous silica aggregates and said carbonaceous composite.

17. The tire of claim 1 wherein said tire component is a tire tread.

18. The tire of claim 2 wherein said tire component is a tire tread.

19. The tire of claim 6 wherein said tire component is a tire tread.

20. The tire of claim 8 wherein said tire component is a tire tread.

* * * * *